Figure 1:
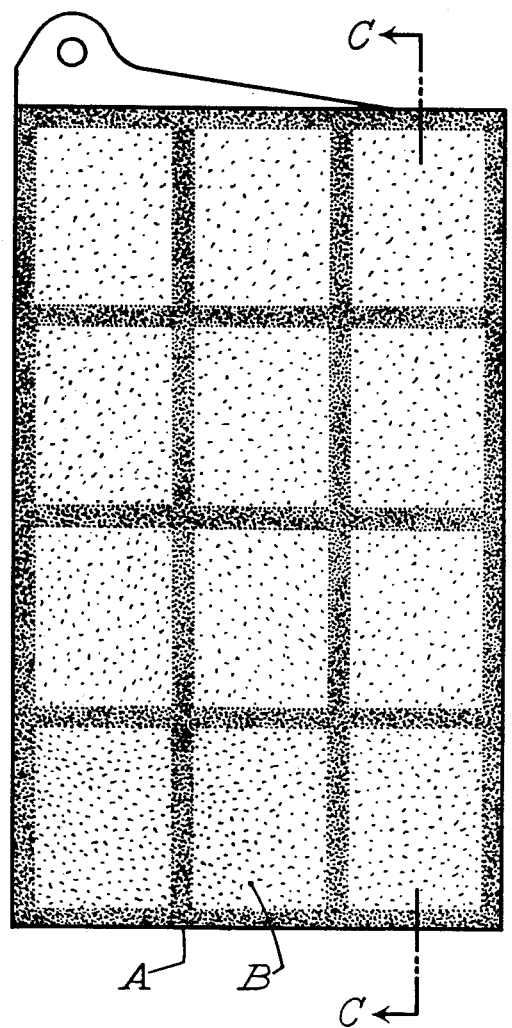

Dec. 19, 1933.    K. ACKERMANN    1,940,385
ELECTRODE FOR ACCUMULATORS
Filed July 11, 1931

INVENTOR-
KARL ACKERMANN
BY
ATTORNEYS-

Patented Dec. 19, 1933

1,940,385

UNITED STATES PATENT OFFICE

1,940,385

ELECTRODE FOR ACCUMULATORS

Karl Ackermann, Mannheim, Germany, assignor to I. G. Farbenindustrie Aktiengesellschaft, Frankfort-on-the-Main, Germany Application July 11, 1931, Serial No. 550,279, and in Germany July 19, 1930

3 Claims. (Cl. 136—25)

The present invention relates to negative electrodes for accumulators.

It has already been proposed to prepare highly porous sintered articles, especially those having the shape of plates from iron powder. These may be employed as the negative electrodes in accumulators having alkaline electrolytes. Electrode plates of especially good nature are obtained when employing for the sintering iron powder obtained by the decomposition of iron carbonyl. By subsequently sintering the plates at elevated temperatures it is possible to impart to them a great mechanical strength in addition to the high porosity. An objection to the said electrode plates which are characterized by the simplicity of their preparation and by a particularly high specific capacity consists in the fact that when employed for long periods of time their mechanical strength gradually lessens. This is due to the fact that the electrode bodies undergo continual chemical conversions during charging and discharging and these conversions give rise to a loosening of the cohesion of the electrodes.

It has already been proposed to strengthen these electrodes by means of a framework of compact metal inserted therein. Electrodes of this kind are obtainable by sintering iron powder enclosing such framework of compact metal, such as for example perforated metal plates, wires or a network of wires. Since, however, compact metal does not expand in the same degree as the metal powder, the coherence of the porous parts of the plate with the compact metallic parts and consequently the strength and conductivity of the electrodes is sometimes not sufficient.

I have now found that negative electrodes of substantially uniform porous structure consisting of iron and strips of an iron-nickel alloy do not lose their strength in use and have a perfect conductivity. This is due to the fact that the iron-nickel alloy does not take part in the electrochemical processes and, therefore, continually retains its mechanical strength and serves as a framework for the remaining parts of the plate. The iron-nickel alloy may have the form of a framing of the plate, or may consist of a framework of strips across the plate, or a series of strips parallel to the longitudinal or side edges of the plates. The production of the said inactive, mechanically stable framework may be effected, for example, by impregnating with a solution of a nickel salt strips of the iron sinter plate parallel to its edges and then washing the plate with caustic alkali solution, so that nickel hydroxide is precipitated at the impregnated places. By heating the said plate in a reducing atmosphere, an iron nickel alloy is formed which continually retains its mechanical stability. The impregnation may be carried out by dipping the edges of the porous iron plate first into a solution of a nickel salt and afterwards into a caustic alkali solution. For the production of a framework or strips passing across the plate by the said method, the iron plate is covered by a solid plate having openings at the places where the framework or the strips are to be produced, and first a solution of a nickel salt and then a caustic alkali solution is sucked through these openings and through those parts of the plate beneath the openings.

A more convenient method of producing electrodes having such framework or strips of an iron-nickel alloy consists in combining the production of such framework or strips with the manufacture of the porous plates themselves by sintering iron powder in the form of electrodes containing nickel powder at the places where the framework or strips of iron-nickel alloy are to be produced.

For the preparation of the electrodes iron prepared by decomposition of iron carbonyl is preferably employed since this is particularly free from impurities especially from non-metals, such as phosphorus, sulphur and silicon.

The iron plates containing strips of iron-nickel alloy thus prepared may directly be used as negative electrodes for accumulators having alkaline electrolytes, but the pores of the iron plates may also afterwards be filled with an active mass, for example cadmium oxide, which may be introduced by impregnating the plates with a solution of a cadmium salt and precipitating cadmium hydroxide within the pores by means of a solution of caustic alkali.

Reference is here made to the accompanying drawing which shows a structural modification of my invention.

Figure 2:
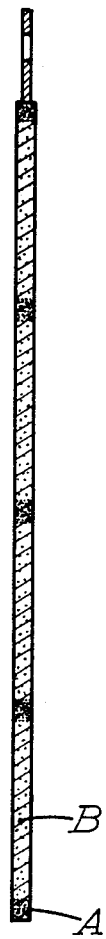

Fig. 1 of the drawing discloses a front elevation of an electrode and Fig. 2 shows a cross section on line C—C of Fig. 1.

On the drawing

The strips of iron-nickel alloy of the electrode are designated by the reference character A. The reference character B denotes the active mass of porous iron retained between said strips A.

The following examples will further illustrate the nature of this invention but the invention is not restricted to these examples.

Example 1

A porous plate prepared by sintering iron powder is impregnated with a solution of 2 parts of crystallized nickel nitrate in 1 part of water in such a manner that not the whole of the plate but only strips forming a framework or lattice are impregnated. The nickel salt is converted into nickel hydroxide by rinsing with caustic soda solution and the nickel hydroxide is reduced by heating the plate at about 1000° C. in hydrogen whereby the nickel alloys with the iron, thus forming a framework of an iron-nickel alloy resistant to the electrochemical processes occurring in accumulators having alkaline electrolytes. The plate is then used as the negative electrode in an accumulator having an alkaline electrolyte. After a great number of discharges the plate retains its original strength unchanged while a plate not treated according to this example loses its strength to such an extent under the said conditions that it can readily be broken into pieces.

*Example 2*

A mould of sheet iron is filled with iron prepared by decomposition of iron carbonyl. The iron powder is removed at the edges and in strips parallel to the edges and replaced by a mixture of 90 per cent of iron powder and 10 per cent of nickel powder. The mould is then slowly heated to about 650° C. and kept thereat for several hours until a coherent porous metal plate is obtained. The sinter plate thus obtained is then strengthened by a second sintering treatment at about 1100° C. whereby the nickel alloys with the iron so that a framework of an iron-nickel alloy is formed. After a great number of discharges the strength of the framework is unaltered.

What I claim is:

1. As new article of manufacture negative electrodes for accumulators having alkaline electrolytes, of substantially uniform porous structure, consisting of iron and strips of an iron-nickel alloy.

2. As new article of manufacture negative electrodes for accumulators having alkaline electrolytes, of substantially uniform porous structure, consisting of iron prepared by decomposition of iron carbonyl and strips of an iron-nickel alloy.

3. As new article of manufacture negative electrodes for accumulators having alkaline electrolytes, of substantially uniform porous structure, consisting of iron prepared by decomposition of iron carbonyl and strips of an iron-nickel alloy containing about 90 per cent of iron and 10 per cent of nickel.

KARL ACKERMANN.